R. C. STONE.
CABINET FOR POLE CHANGERS AND BATTERIES.
APPLICATION FILED OCT. 27, 1910.

1,004,101.

Patented Sept. 26, 1911.
2 SHEETS—SHEET 1.

Witnesses
Frank A. Fahle
Thomas H. McMeans

Inventor
Richard C. Stone,
By Bradford Hood
Attorneys.

R. C. STONE.
CABINET FOR POLE CHANGERS AND BATTERIES.
APPLICATION FILED OCT. 27, 1910.

1,004,101.

Patented Sept. 26, 1911.

2 SHEETS—SHEET 2.

Witnesses

Inventor
Richard C. Stone,
By Bradford Hood.
Attorneys.

UNITED STATES PATENT OFFICE.

RICHARD C. STONE, OF MUNCIE, INDIANA, ASSIGNOR TO WARNER ELECTRIC COMPANY, OF MUNCIE, INDIANA, A CORPORATION OF INDIANA.

CABINET FOR POLE-CHANGERS AND BATTERIES.

1,004,101. Specification of Letters Patent. Patented Sept. 26, 1911.

Application filed October 27, 1910. Serial No. 589,450.

*To all whom it may concern:*

Be it known that I, RICHARD C. STONE, a citizen of the United States, residing at Muncie, in the county of Delaware and State of Indiana, have invented a new and useful Cabinet for Pole-Changers and Batteries, of which the following is a specification.

In the operation of telephone exchanges in small towns, the desired pulsating and alternating current is obtained by means of a vibratory pole changing apparatus operating upon a current supplied from a plurality of batteries which, quite commonly, are of the dry cell type. In the operation of such an apparatus, it has heretofore been a matter of considerable difficulty to replace exhausted batteries which furnish the current for the pole changer which converts the current into alternating and pulsating currents, or the closed circuit battery which operates the vibratory of the pole changer.

The object of my present invention, therefore, is to provide a cabinet which may be conveniently made practically dust proof in which the entire equipment of dry cell batteries for the alternating and pulsating current, the closed circuit cell for the vibratory, and the pole changing apparatus itself, may be conveniently mounted in such manner that any portion of the apparatus may be readily withdrawn for inspection, adjustment and replacement without disturbing the various electrical connections and, so far as the dry cells are concerned, without interfering with the continued operation of the pole changer.

The accompanying drawings illustrate my invention.

Figure 1:
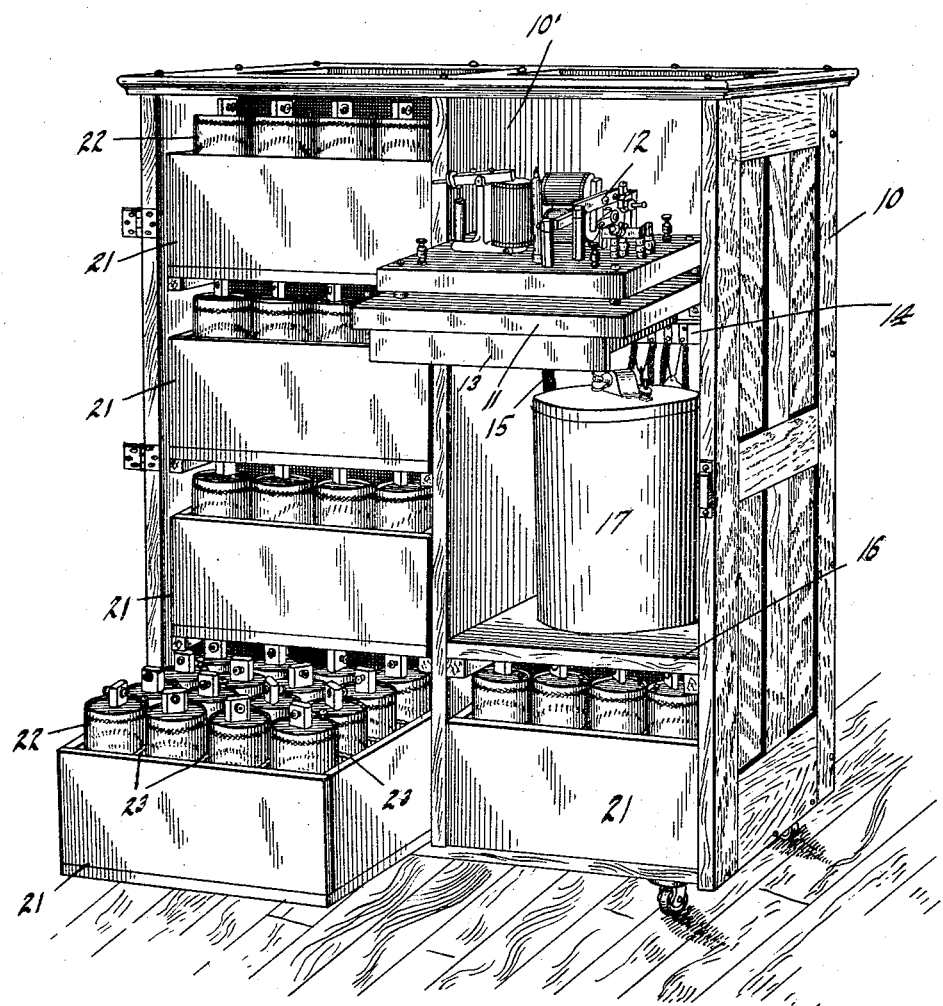
Figure 2:
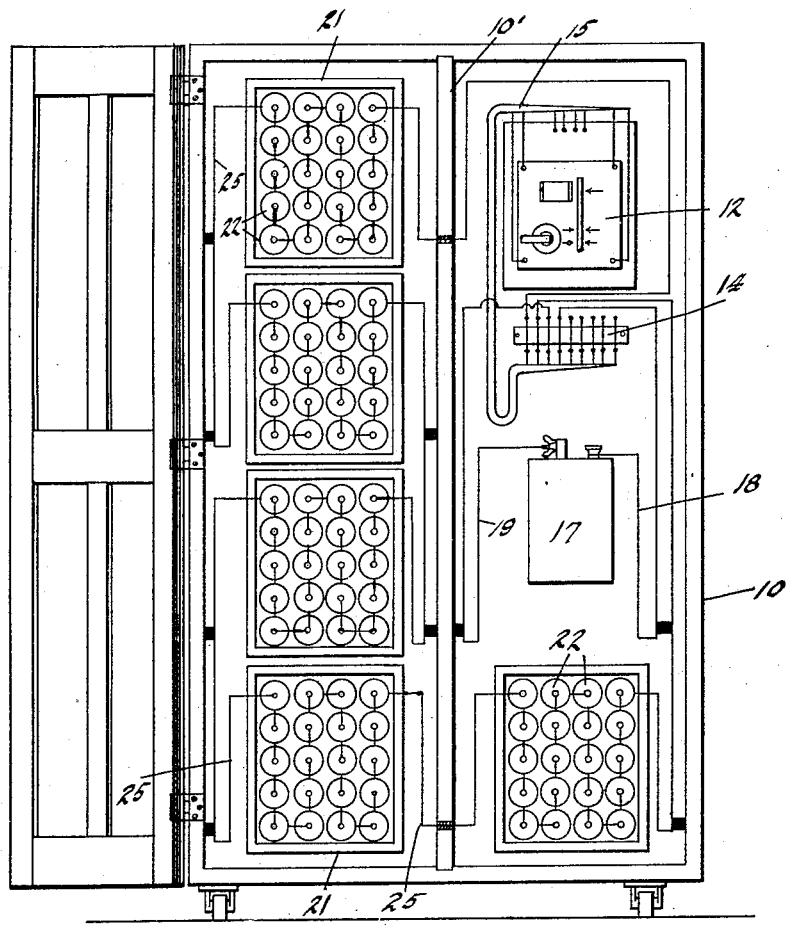
Figure 3:
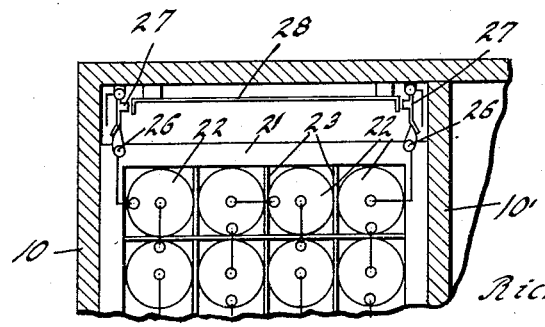

Figure 1 is a perspective view of my improved cabinet fully equipped, the front door being removed, the pole changer shelf drawn out, and one of the dry cell drawers also drawn out; Fig. 2 is a diagram showing the relative arrangement of parts and the wiring, and Fig. 3 a detail showing a convenient structure by means of which withdrawal of any one of the dry cell drawers may be accomplished without discontinuing the major portion of the supply of alternating and pulsating current of the main line.

In the drawings, 10 indicates a suitable inclosing casing conveniently divided into two vertical chambers by a central partition 10'. Mounted in the upper part of one of these chambers is a forwardly withdrawable shelf 11 upon which the pole changing apparatus 12 may be firmly secured, this shelf conveniently carrying the necessary condenser 13 on its under face. Mounted in the rear of casing 10 below shelf 11 is a binding post bar 14 to which the various portions of the cable 15 may be secured, said cable then extending to the binding post of the pole changing apparatus, the length of the cable 15 being sufficient to permit withdrawal of shelf 11 to bring the pole changing apparatus into position for inspection and adjustment, without disturbing any connections. Arranged a suitable distance below shelf 11 is another forwardly withdrawable shelf 16 upon which is placed the wet cell 17 provided to supply a continuous current to the vibratory of the pole changing apparatus. This cell 17 is connected by wires 18, 19 with the binding post bar 14, the said wires 18 and 19 being of sufficient length to permit withdrawal of the shelf 16 enough to bring the cell 17 into position for convenient access. The connections are also made on this terminal for the alternating and pulsating connections to the switch board. Slidably mounted in the remaining portion of the cabinet 10 are several drawers 21, 21 which are vertically separated a sufficient distance to receive the up-standing dry cells 22. Each drawer 21 is preferably divided into a plurality of pockets by longitudinal and transverse partitions 23 so that each cell 22 stands in a separate pocket. The several cells of each drawer are connected together in series and the end cells of each group connected by suitable connections with the adjacent group. In the diagram shown in Fig. 2 these connections are indicated as wires 25 which have sufficient slack to permit the withdrawal of any drawer enough to fully expose the cells in that drawer. In order, however, to permit the complete withdrawal of any group of cells without interfering with the continued operation of the apparatus, I may carry the wires from the end battery cells 22 of each group to contact fingers 26, 26 (Fig. 3) each of which is adapted to engage a terminal 27 when drawer 21 is pushed back within the casing. Each terminal 27 is connected to a similar terminal of an adjacent group and one or both of these terminals should have sufficient flexibility to be laterally moved when the terminal 26 strikes it. The two terminals 27 may directly contact with each other when the drawer is withdrawn or a connecting bar 28 may be provided, the arrangement being such that, when the terminals 26 are pushed into engagement with the terminals 27, the terminals 27 will be separated from each other. By this arrangement any group of battery cells 22 may be entirely withdrawn from the apparatus without interfering with the continuous supply of current to the main line, this current merely reduced by the amount of withdrawal.

I claim as my invention:

1. The combination, with a containing casing, of a laterally withdrawable support in said casing, a pole changer mounted upon said laterally withdrawable support, a second laterally withdrawable support in said casing, a constant current battery mounted upon said second laterally withdrawable support, a plurality of laterally withdrawable battery supports also mounted in said casing, and wiring between said several parts of such character as to permit lateral withdrawal of the said several supports and the apparatus carried thereby without interfering with the electrical connections.

2. The combination, with an inclosing casing, of a laterally withdrawable pole changer support mounted therein, a pole changer mounted thereon, a laterally withdrawable battery support mounted therein, a continuous current battery mounted on said support, electrical connections between said continuous current battery and vibratory of the pole changer permitting lateral withdrawal of either pole changer or the battery without disturbing such connections, a plurality of laterally withdrawable battery drawers also mounted in said cabinet, and electrical connections between the said several drawers and the pole changer permitting lateral withdrawal of each of said drawers and the pole changer without disturbing such electrical connection, the electrical connections between the several drawers being such that withdrawal of any drawer will automatically establish a bridging connection across the gap produced by such withdrawal.

In witness whereof, I, RICHARD C. STONE have hereunto set my hand and seal at Muncie, Indiana, this 21st day of October, A. D. one thousand nine hundred and ten.

RICHARD C. STONE. [L. S.]

Witnesses:
 ROY P. JOHNSON,
 JOHN E. JOHNSON.

---

Copies of this patent may be obtained for five cents each, by addressing the "Commissioner of Patents, Washington, D. C."